United States Patent [19]
Van Beek et al.

[11] Patent Number: 5,883,498
[45] Date of Patent: Mar. 16, 1999

[54] BATTERY-POWERED ELECTRICAL DEVICE

[75] Inventors: Johann R. G. C. M. Van Beek, Eindhoven; Eduard E. A. Gillissen, Heerlen, both of Netherlands

[73] Assignee: U.S. Philips Corporation, NY, N.Y.

[21] Appl. No.: 926,274

[22] Filed: Sep. 5, 1997

[30] Foreign Application Priority Data

Sep. 10, 1996 [EP] European Pat. Off. .............. 96202522

[51] Int. Cl.⁶ ....................................................... H02J 7/00
[52] U.S. Cl. ........................... 320/136; 320/118; 324/433
[58] Field of Search .................................... 320/118, 152, 320/136, 134; 324/433

[56] References Cited

U.S. PATENT DOCUMENTS 4,622,508 11/1986 Matteau et al. ......................... 320/118
5,206,578 4/1993 Nor .......................................... 320/118

*Primary Examiner*—Peter S. Wong
*Assistant Examiner*—Gregory J. Toatley, Jr.
*Attorney, Agent, or Firm*—Steven R. Biren

[57] ABSTRACT

A battery-powered electrical device with a rechargeable battery pack and a means for preventing excessive discharge of the cells in the battery pack. Each cell is characterized by a voltage-value $V_{end}$ at which it is desirable to terminate discharge of the cell. The cells are divided into a number of mutually exclusive subsets $s_i$ having $N_i$ cells. The device comprises means for measuring the series voltage $V_i$ across each subset $s_i$, and interrupting the current to the device if the condition $V_i \leq n_i \times V_{end}$ is met in any of the subsets $s_i$.

1 Claim, 1 Drawing Sheet

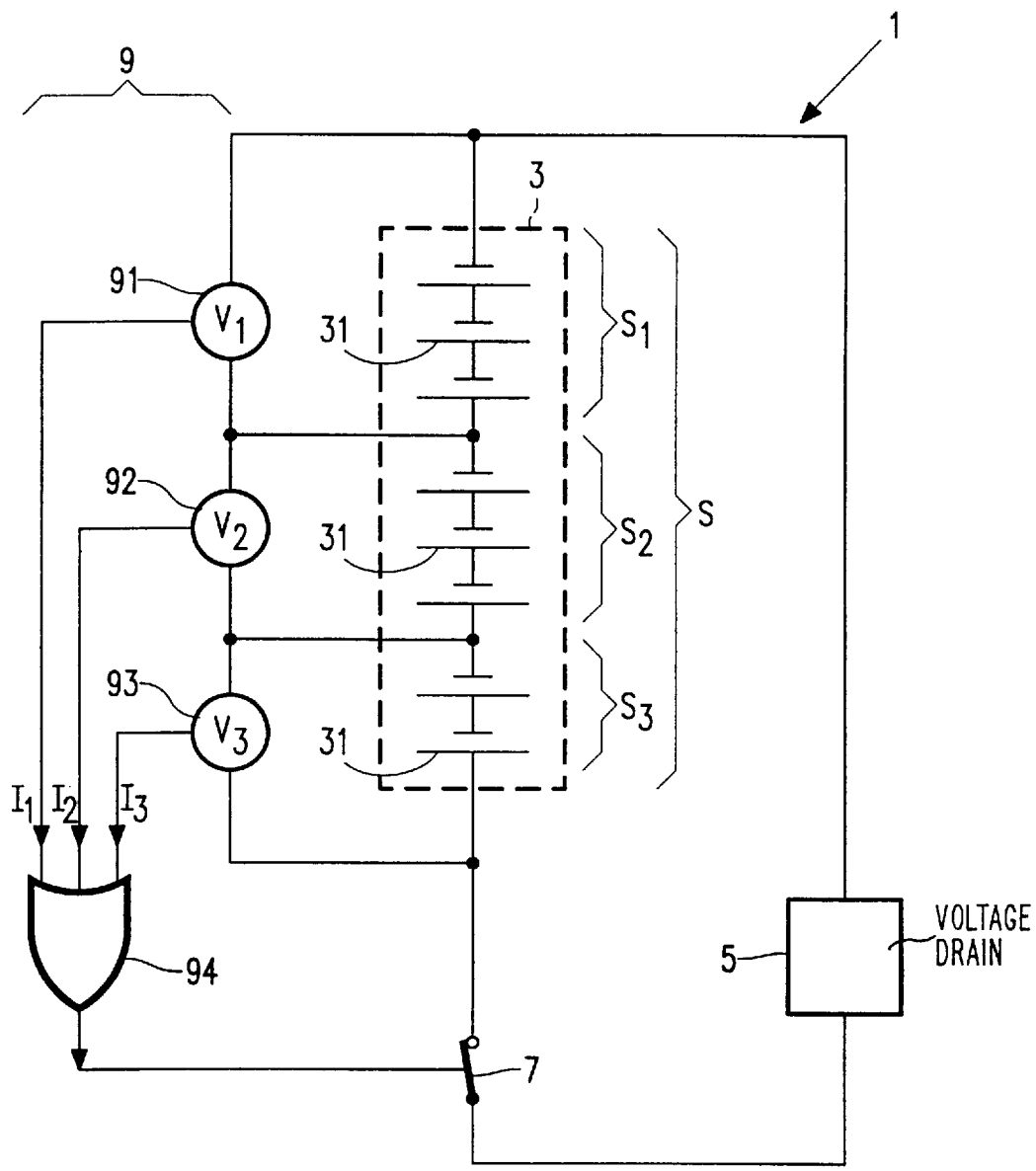

BATTERY-POWERED ELECTRICAL DEVICE

BACKGROUND OF THE INVENTION

Field of the Invention

The invention relates to a battery-powered electrical device comprising a rechargeable battery pack and a switchable voltage drain, the battery pack containing a set S of individual cells in series connection, the set S having a cardinal number N greater than two, each cell being characterized by:
- a nominal voltage $V_{bat}$;
- a minimal permissible voltage-value $V_{min}$;
- a voltage-value $V_{end}$ at which it is desirable to terminate discharge of the cell.

The term "cardinal number" refers to the number of elements in a set, i.e. in this case the number of cells in the set S. The term "nominal voltage" refers to the (rated) voltage across the terminals of the cell when it is loaded ("battery pole voltage"), and specifically refers to the average voltage on the plateau of the cell's discharge curve. The value of $V_{min}$ for a given application is a selected voltage-level through which even the weakest cell in the battery pack should not be allowed to discharge, under any circumstances. The value of $V_{end}$ for a given application is a selected voltage-level below which further discharge of the cell is of little use, since the remaining cell voltage will be insufficient to satisfactorily operate the device.

2. Description of Related Art

Devices of this type are well known from everyday experience, and include, for example, electric power tools, video cameras, mini vacuum cleaners, lap-top computers, electronic notebooks, portable music sources, torches, mobile communication devices, etc. Because such devices are commonly designed to operate at a rated voltage which is higher than the nominal voltage $V_{bat}$ of common cells (e.g. 1.25 V), the devices must accordingly derive their power from series-arrays of such cells (i.e. battery packs).

Many commonly-available battery-powered devices contain a voltage drain (e.g. a motor, lamp, electrical circuit, etc.) which simply continues to draw power from the battery pack until the pack's residual voltage is no longer sufficient to operate the device; the operator is then expected to recharge the battery pack before further use. However, it is now generally known that such depletory usage can be detrimental to the performance of the battery pack in the long run, since discharge of cells beyond a certain point can cause the occurrence of irreversible chemical reactions within the cells, which can damage their performance. For this reason, it is generally desirable to interrupt power to the voltage drain well before the battery pack becomes depleted, and then to recharge the battery pack before further use.

One way of performing this interruption is to choose a voltage-value $V_{end}$ at which it is desirable to terminate discharge of the cell, to continually measure the voltage $V_{pack}$ across the pack, and to interrupt power to the voltage drain as soon as $V_{pack}=N \times V_{end}$ (cut-off monitoring). A problem with such an approach, however, is that, if the pack contains a weak cell, then such a cell can still be over-discharged, despite the above-mentioned cut-off procedure. For example, if N=5, $V_{bat}$=1.25 V, $V_{min}$=0 V and $V_{end}$=0.9 V, then $N \times V_{end}$=4.5 V. However, if one of the cells is empty and the other four are full, then, initially, $V_{pack}$=4×1.25 V+0 V=5 V, which is greater than $N \times V_{end}$ (=4.5 V), so that cut-off will not yet occur. Under these circumstances, discharge of the battery pack will continue, despite the fact that one of the cells in the pack is already completely discharged. This will generally result in irreversible damage to the weak cell, causing it to weaken even further.

An alternative is to individually monitor each cell, and to interrupt the voltage drain as soon as the voltage across any given cell reaches $V_{end}$. However, this approach requires considerable extra circuitry, especially in the case of battery packs with relatively large values of N (more than 5, for example).

SUMMARY OF THE INVENTION

It is an object of the invention to provide a device as stated in the opening paragraph, in which device over-discharge of individual cells is prevented, without having to monitor each cell individually.

This object is achieved according to the invention in a device as specified in the opening paragraph, characterized in that:
- the set S is divided into a number of mutually exclusive subsets $s_i$ of cardinal number $n_i$, whereby $0<n_i<N$, at least one cardinal number $n_i$ is greater than 1, and the sum of all the cardinal numbers $n_i$ is equal to N;
- $n_i \leq n$, where n is the largest natural number satisfying the relationship:
  $n<(V_{bat}-V_{min})/(V_{bat}-V_{end})$;
- the device comprises means for measuring the series voltage $V_i$ across each subset $s_i$, and interrupting the switchable voltage drain if the condition:
  $V_i \leq n_i \times V_{end}$
  is met in any of the subsets $s_i$.

The stipulation that the subsets $s_i$ be mutually exclusive amounts to saying that no two subsets have a cell in common, i.e. $s_i \cap s_j = \emptyset$, for any $i \neq j$. In addition, none of the subsets is empty. It should be explicitly noted that the battery pack does not have to be physically divided up (i.e. split) into separate subsets $s_i$: rather, the subsets $s_i$ should be viewed as administrative groupings within the battery pack, which remains intact.

Cut-off monitoring in the device according to the invention is neither based on measuring the voltage across the battery pack as a whole ($n_i<N$) nor on individually measuring the voltage across each cell ($n_i>1$ for at least one subset $s_i$). Instead, the battery pack is divided into subsets (subgroups) of cells, and the voltage across each of these subsets is monitored. The monitoring principle can be elucidated as follows:

(1) The stipulation:
  $n_i<(V_{bat}-V_{min})/(V_{bat}-V_{end})$
  can alternatively be written in the form:
  $(n_i-1) \times V_{bat}+V_{min}<n_i \times V_{end}$.

(2) If, in a given subset $s_i$, the weakest cell has discharged as far as the minimum permissible voltage $V_{min}$, then the maximum possible voltage across the subset $s_i$ can never be more than:
  $V_i^{max}=(n_i-1) \times V_{bat}+(1) \times V_{min}$
  $=(n_i-1) \times V_{bat}+V_{min}$.

(3) Combining this with the previous inequality, it transpires that:
  $V_i^{max}<n_i \times V_{end}$.
  However, this falls within the cut-off condition:
  $V_i<n_i \times V_{end}$
  It thus transpires that discharging cannot continue beyond the point where one of the cells has discharged as far as the minimum permissible voltage.

For nickel metal hydride (NiMH) cells and NiCd cells, the value of $V_{bat}$ is generally about 1.25 V. This voltage remains substantially constant over a relatively wide portion of such a cell's discharge curve, then descends to a value of about 1.1 V before undergoing a sharp drop towards zero. A value of $V_{end}$ of the order of 0.85–1.0 V corresponds to the start of this sharp drop, just over the characteristic "knee" in the cell's discharge curve. In general, a value of zero can be used for $V_{min}$, though higher values van be used if required or desired in a particular application.

BRIEF DESCRIPTION OF THE DRAWING

The invention and its attendant advantages will be further elucidated with the aid of exemplary embodiments and the accompanying schematic drawing, whereby the FIGURE depicts a circuit diagram of a device according to the invention.

DETAILED DESCRIPTION OF THE PREFERRED EMBODIMENTS

Embodiment 1

The FIGURE depicts a particular embodiment of a device 1 according to the invention, such as an electric drill. The device 1 comprises a rechargeable battery pack 3 containing a set S of individual cells 31 in series connection; in this case, the set S has a cardinal number N=eight, i.e. the pack 3 contains eight cells 31. The device 1 further comprises a voltage drain 5 (e.g. an electric motor), which is connected across the pack 3 via a switch 7.

In this particular embodiment, the following considerations apply:

Each cell 31 is a NiMH battery, with a nominal voltage $V_{bat} \approx 1.25$ V;

The voltage across any given cell 31 would, in principle, be allowed to drop as far as zero, but no further: consequently, $V_{min} = 0$ V;

$V_{end}$ is chosen to be 0.9 V.

As a result, $(V_{bat} - V_{min})/(V_{bat} - V_{end}) = 1.25/0.35 \approx 3.57$, so that n=3.

In accordance with this calculation, and in further accordance with the invention, the battery pack 3 is divided into a number of mutually exclusive subsets $s_i$, each of which has a cardinal number $n_i < 3$. In this particular case, there are three subsets $S_1$, $S_2$, $S_3$ with respective cardinal numbers $n_1 = 3$, $n_2 = 3$, $n_3 = 2$, whereby $\Sigma n_i = 3+3+2 = 8 = N$.

The device 1 further comprises means 9 for measuring the series voltage $V_i$ across each subset $s_i$ and comparing it with a reference voltage $n_i \times V_{end}$. As here depicted, the means 9 comprise voltmeters 91, 92, 93 which respectively measure the voltages $V_1$, $V_2$, $V_3$ across each of the subsets $s_1$, $s_2$, $s_3$, and compare them with the respective reference voltages 2.7 V, 2.7 V, 1.8 V. If any of the values $V_1$, $V_2$, $V_3$ is found to exceed the corresponding reference voltage, a signal is sent to the OR-gate 94 via one of its respective inputs $I_1$, $I_2$, $I_3$; the output signal from the OR-gate 94 can then be used to open the switch 7, thereby interrupting the voltage drain 5.

It should be noted that the circuitry 7,9 can be incorporated into the battery pack 3, or it can be accommodated within part of the housing of the device 1. The battery pack 3 may be removable, so as to be rechargeable outside the device 1, or it may be permanently incorporated in the device 1, so as to be rechargeable in situ.

Embodiment 2

In an alternative scenario to that in Embodiment 1, the battery pack contains four subsets $s_i$, each with a cardinal number $n_i = 2$. Such an embodiment still satisfies the requirements:

$n_i \leq n = 3$;

$\Sigma n_i = N = 8$.

In yet another alternative, it is, for example, possible to select four subsets with cardinal numbers $n_1 = 3$, $n_2 = 2$, $n_3 = 2$, $n_4 = 1$.

We claim:

1. A battery-powered electrical device comprising a rechargeable battery pack and a switchable voltage drain, the battery pack comprising a set S of individual cells in series connection, the set S having a cardinal number N greater than two, each cell being characterized by:

a nominal voltage $V_{bat}$;

a minimal permissible voltage-value $V_{min}$;

a voltage-value $V_{end}$ at which it is desirable to terminate discharge of the cell, characterized in that:

the set S is divided into a number of mutually exclusive subsets $s_i$ of cardinal number $n_i$, whereby $0 < n_i < N$, at least one cardinal number $n_i$ is greater than 1, and the sum of all the cardinal numbers $n_i$ is equal to N;

$n_i \leq n$, where n is the largest natural number satisfying the relationship;

$n < (V_{bat} - V_{min})/(V_{bat} - V_{end})$;

the device comprises means for measuring the series voltage $V_i$; across each subset $s_i$, and interrupting the switchable voltage drain if the condition;

$V_i \leq n_i \times V_{end}$ is met in any of the subsets $s_i$.

* * * * *